(12) United States Patent
Wu

(10) Patent No.: US 8,552,706 B2
(45) Date of Patent: Oct. 8, 2013

(54) STABILITY METHODS AND STRUCTURES FOR CURRENT-MODE DC-DC VOLTAGE CONVERTERS

(75) Inventor: Guoming Wu, Shanghai (CN)

(73) Assignee: Analog Devices, Inc., Norwood, MA (US)

( * ) Notice: Subject to any disclaimer, the term of this patent is extended or adjusted under 35 U.S.C. 154(b) by 226 days.

(21) Appl. No.: 13/074,984

(22) Filed: Mar. 29, 2011

(65) Prior Publication Data

US 2012/0249106 A1    Oct. 4, 2012

(51) Int. Cl.
*G05F 1/00*    (2006.01)

(52) U.S. Cl.
USPC .......................... 323/288; 323/284; 323/285

(58) Field of Classification Search
USPC .......................................... 323/284, 285, 288
See application file for complete search history.

(56) References Cited

U.S. PATENT DOCUMENTS

| | | | |
|---|---|---|---|
| 5,742,151 A | 4/1998 | Hwang | 323/222 |
| 5,798,635 A | 8/1998 | Hwang et al. | 323/222 |
| 6,348,779 B1 | 2/2002 | Sluijs | 323/222 |
| 6,972,548 B2 | 12/2005 | Tzeng et al. | 323/282 |
| 7,026,801 B2 | 4/2006 | Fowler et al. | 323/271 |
| 7,045,992 B1 | 5/2006 | Silva et al. | 323/222 |
| 7,109,688 B1 | 9/2006 | Chiu et al. | 323/222 |
| 7,230,408 B1 | 6/2007 | Vinn et al. | 323/273 |
| 7,248,027 B2 | 7/2007 | Ribeiro et al. | 323/282 |
| 7,358,711 B2 | 4/2008 | Sutardja et al. | 323/283 |
| 7,382,114 B2 | 6/2008 | Groom | 323/271 |
| 7,595,624 B2* | 9/2009 | Tateishi et al. | 323/288 |
| 8,154,267 B2* | 4/2012 | Noda | 323/285 |
| 2007/0064460 A1* | 3/2007 | Siman-Tov | 363/132 |
| 2007/0096703 A1* | 5/2007 | Jain | 323/282 |
| 2008/0030178 A1* | 2/2008 | Leonard et al. | 323/282 |
| 2009/0058383 A1* | 3/2009 | Ryoo | 323/282 |
| 2009/0237047 A1* | 9/2009 | Matsugaki et al. | 323/282 |
| 2009/0243577 A1* | 10/2009 | Lim | 323/283 |
| 2012/0049826 A1* | 3/2012 | Hsu et al. | 323/284 |

OTHER PUBLICATIONS

Smith, Greg, "Understanding Non-Linear Slope Compensation", EE Times—India, parts 1 and 2, National Semiconductor Corporation, Sep. 11, 2007, pp. 1-8 and 1-10.
"An Efficiency Primer for Switch-Mode, DC-DC Converter Power Supplies", Application Note 4266, pp. 1-13, Dec. 23, 2008 Maxim Integrated Products, Sunnyvale, California.

* cited by examiner

*Primary Examiner* — Adolf Berhane
*Assistant Examiner* — Gary Nash
(74) *Attorney, Agent, or Firm* — Schwegman Lundberg & Woessner, P.A.

(57) ABSTRACT

DC-DC voltage converter structures and methods are provided that employ first and second transistors which are switched to control currents through an inductor and a capacitor to thereby provide an output voltage substantially equal to a predetermined reference voltage. Preferably included is a voltage feedback loop in which an error voltage is fed back to a loop comparator and further included is a current feedback loop that provides to the comparator a first voltage ramp whose amplitude is proportional to the amplitude of the converter's input current. The output signal of the comparator sets the duty cycles of the first and second transistors. In each converter period, the first and second transistors of the voltage converter respectively control, through the inductor, a first current with a rising slope and a second current with a falling slope. Finally, converter stability is enhanced by providing a second voltage ramp having a slope related to a fraction (e.g., ½) of the falling slope and then comparing the error voltage of the voltage feedback loop to the sum of the first and second voltage ramps.

17 Claims, 3 Drawing Sheets

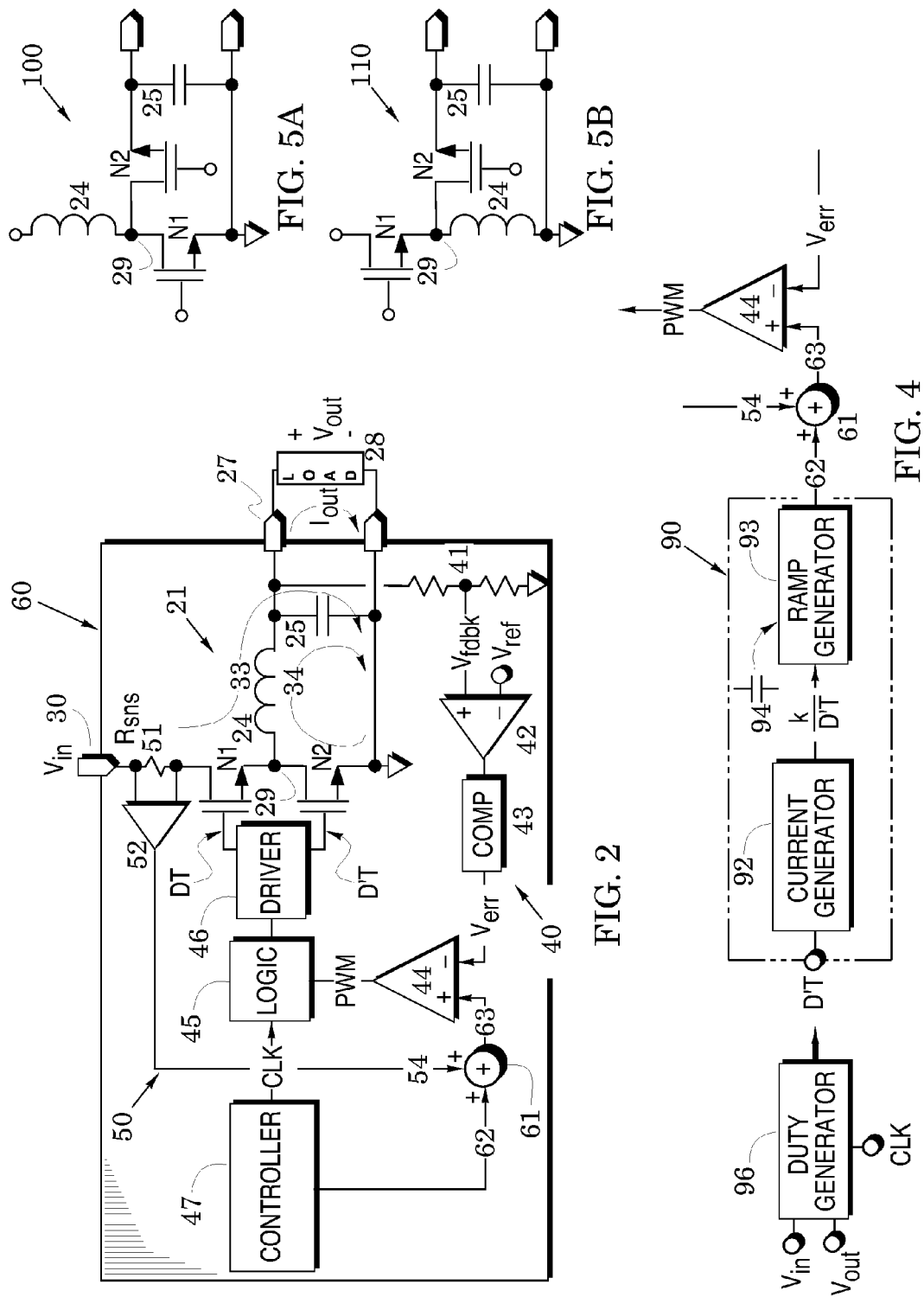

STABILITY METHODS AND STRUCTURES FOR CURRENT-MODE DC-DC VOLTAGE CONVERTERS

BACKGROUND OF THE INVENTION

1. Field of the Invention

The present description relates generally to DC-DC voltage converters.

2. Description of the Related Art

Switched-mode DC-DC voltage converters provide superior voltage conversion efficiency because they regulate an output voltage with transistor switches that are either on or off so that they never operate in the linear region in which both current and voltage are nonzero. Because at least one of transistor current and voltage is therefore always close to zero, dissipation is greatly reduced so that the converter efficiency is quite high.

These converters typically include a voltage feedback loop in which the difference between the output voltage and a reference voltage forms an error voltage $V_{err}$. The error voltage can be compared to a fixed voltage ramp to provide a pulse-width modulation signal that determines the duty cycles of a converter's first and second transistors.

It has been found that this voltage feedback loop can be augmented with a current feedback loop which replaces the fixed voltage ramp with a ramp whose amplitude is proportional to the converter's input current. The current feedback loop enables the voltage converter to respond more quickly to changes in the input voltage. It has been found, however, that voltage converters with current feedback loops often exhibit instability when the duty cycle of the first transistor becomes large, e.g., when it exceeds 50%.

BRIEF SUMMARY OF THE INVENTION

The present embodiments are generally directed to DC-DC voltage converters that are configured to be stable even when operating with high duty cycles. The drawings and the following description provide an enabling disclosure and the appended claims particularly point out and distinctly claim disclosed subject matter and equivalents thereof.

BRIEF DESCRIPTION OF THE DRAWINGS

FIG. 2 is a schematic of another dc-dc voltage converter embodiment;

FIG. 4 is a diagram of a controller embodiment for use in the dc-dc voltage converter embodiment of FIG. 2; and FIGS. 5A and 5B are diagrams of other switching voltage converter embodiments that can be substituted in the dc-dc voltage converter embodiment of FIG. 2.

DETAILED DESCRIPTION OF THE INVENTION

FIGS. 1-5B illustrate DC-DC voltage converter structures and methods that employ first and second transistors that are switched to control currents through an inductor and a capacitor to thereby provide an output voltage substantially equal to a predetermined reference voltage (or a multiple of the reference voltage). A voltage converter in accordance with these illustrations includes a voltage feedback loop in which an error voltage is fed back to a loop comparator and further includes a current feedback loop that provides to the comparator a first voltage ramp whose amplitude is proportional to the amplitude of the converter's input current. The output signal of the comparator sets the duty cycles of the first and second transistors.

In each converter period, the first and second transistors of the voltage converter respectively control, through the inductor, a first current with a rising slope and a second current with a falling slope. It has been found that converter stability is enhanced by providing a second voltage ramp having a slope related to a fraction (e.g., ½) of the falling slope and then comparing the error voltage of the voltage feedback loop to the sum of the first and second voltage ramps.

Figure 1:
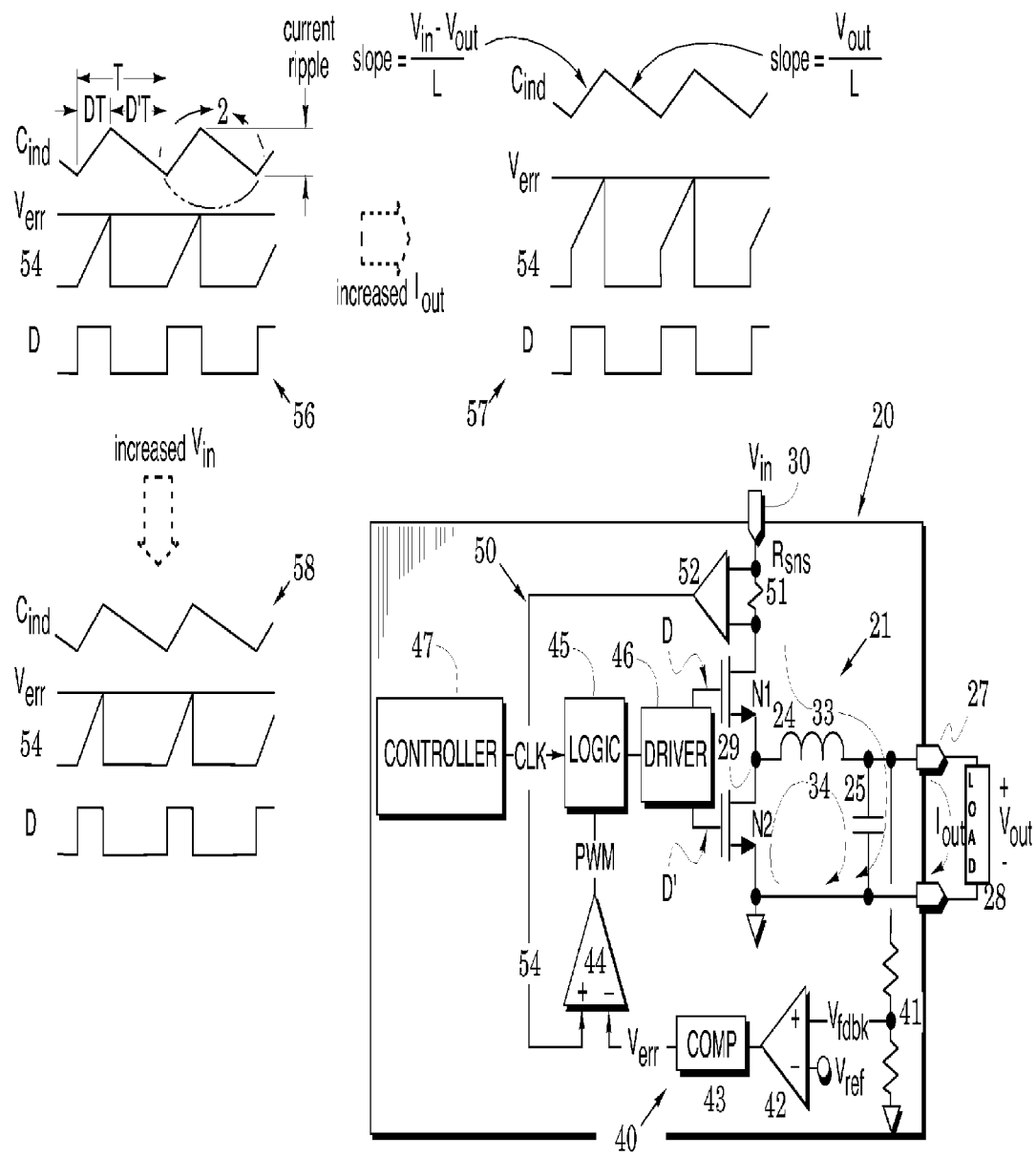
FIG. 1 is a schematic and operational graphs of a dc-dc voltage converter embodiment.

In particular, the DC-DC voltage converter system embodiment 20 of FIG. 1 includes a switching voltage converter 21 that is formed with first and second transistors N1 and N2, an inductor 24 having an inductance L, and an output capacitor 25. The capacitor is coupled across an output port 27 to supply an output voltage $V_{out}$ and an output current $I_{out}$ to an output load 28. The inductor is coupled between the capacitor and a circuit switching node 29. The low-side second transistor N2 is coupled between the switching node and ground and the high-side first transistor N1 is coupled between the switching node and an input voltage port 30.

During a first portion of each of successive clock periods, the high-side first transistor N1 is switched on to thereby raise the switching node 29 almost to an input voltage $V_{in}$ at the input voltage port 30. This initial action drives a first current 33 through the inductor 24 and capacitor 25 (a portion of this current may then be diverted through the load 28 as the output current $I_{out}$). The first current has a rising slope of approximately $(V_{in}-V_{out})/L$. During a final second portion of each of the successive clock periods, the low-side second transistor N2 is switched on to thereby pull the switching node 29 almost to a circuit ground. This final action allows the inductor to continue to support a gradually-declining second current 34 through the capacitor and load. The second current has a falling slope of approximately $V_{out}/L$.

These first and second actions through successive clock periods maintain the output voltage $V_{out}$ in a process that is highly efficient because, in each clock period, each of the first and second transistors is off in one period portion and has only a small saturation voltage across it when carrying current in the other period portion. The duration of the first and second portions of each clock period T is adjusted to establish duty cycles D and D' for the first and second transistors that are automatically controlled to maintain the output voltage $V_{out}$ at a predetermined level.

This automatic control is accomplished with a voltage feedback loop 40 that includes a resistive divider 41, a differential amplifier 42, loop compensation 43, comparator 44, logic 45, and driver 46. A controller 47 provides a clock signal to the logic 45 to set the clock periods. In operation of this loop, the resistive divider provides a feedback voltage $V_{fdbk}$ which the differential amplifier 42 compares to a reference voltage $V_{ref}$ and provides in response, an error voltage $V_{err}$ that is frequency shaped by the frequency response of the compensation 43 to enhance the stability of the loop. The error voltage $V_{err}$ represents a difference between the output voltage $V_{out}$ and the desired reference voltage $V_{ref}$. In a voltage converter embodiment, the error voltage $V_{err}$ can be compared in the comparator 44 to a fixed voltage ramp to thereby provide a pulse-width modulation (PWM) signal to the logic 45.

In response to each period of the clock from the oscillator 47 and to the PWM signal from the comparator 44, the logic 45 commands the driver 46 to turn on the first transistor N1 to realize the duty cycle D that is determined by the error voltage $V_{err}$ (in FIG. 1, the duty cycle D is indicated adjacent the gate of the first transistor N1). The driver 46 subsequently turns on the second transistor N2 for the remainder of each clock period to realize the duty cycle D' (the duty cycle D' is indicated adjacent the gate of the second transistor N2). Accordingly, the first and second transistors respectively pass the first and second currents 33 and 34 in the respective first and second portions of each clock period to maintain the feedback voltage $V_{fdbk}$ substantially equal to the reference voltage $V_{ref}$. This process will maintain the output voltage $V_{out}$ at the output port 27 at the desired level regardless of the output current $I_{out}$ through the load 28.

Although the voltage feedback loop 40 maintains a desired voltage across the output load 28 and responds quickly to changes in the output current $I_{out}$, it responds relatively slowly to changes in the input voltage $V_{in}$ at the input port 30. Therefore, the converter system 20 preferably supplements the voltage feedback loop 40 with a current feedback loop 50 that includes a sense resistor 51 (having a resistance $R_{sns}$) and a differential amplifier 52. Input current from the input port 30 generates a corresponding voltage across the resistor 51 which is amplified by the amplifier 52 to provide a voltage ramp 54 that replaces the fixed voltage ramp 53.

In this converter system embodiment, the error voltage $V_{err}$ is compared to the voltage ramp 54 to thereby provide the PWM signal to the logic 45. When the input voltage $V_{in}$ is fixed, the voltage ramp 54 is also fixed and the performance of the converter system 20 is similar to that of the voltage feedback loop embodiment described above that employs a fixed voltage ramp. When the input voltage $V_{in}$ changes, however, these changes are now immediately reflected in the voltage ramp 54 and, thus, in the PWM signal. Accordingly, the duty cycles of the first and second transistors N1 and N2 are immediately altered to counter the altered input voltage $V_{in}$ and maintain the desired output voltage $V_{out}$ at the output port 27.

The graph 56 of FIG. 1 shows the error voltage $V_{err}$ into the PWM comparator 44 and also shows the voltage ramp 54 which indicates the level of the first current 33 through the inductor 24. When the level of the voltage ramp reaches the error voltage $V_{err}$, the PWM signal switches to cause the logic 45 and driver 46 to turn off the first transistor N1 and turn on the second transistor N2 for the remainder of the clock period. This action sets the duty cycles D and D' of the first and second transistors N1 and N2 (wherein it is noted that D'=1−D). For reference, the duty cycle D is shown in the graph 56.

In response to these duty cycles of the first and second transistors, the inductor current $C_{ind}$ ramps up during the first portion DT of each clock period T and ramps down during the second portion D'T of each clock period as shown in the graph 56. These ramps define a current ripple through the inductor 24. The rising slope of the current through the inductor 24 when the first transistor N1 is on is given by $(V_{in}-V_{out})/L$ and the falling slope when the second transistor N2 is on is given by $(V_{out})/L$. Although these slopes are shown in the graph 57 for ease of illustration, they apply generally to graphs 56, 57 and 58.

A broken-line arrow labeled "increased $I_{out}$" points to the graph 57 of FIG. 1 which shows changes in the graph 56 due to an increase in the output current $I_{out}$ at the output port 27 of the voltage converter system 20 that result from a change in the load 28. Accordingly, input current 33 through the first transistor N1 has increased to answer the demand for additional current in the load 28. Although this causes the voltage ramp 54 from the amplifier 52 to rise, it does not substantially alter the rising slope of the voltage ramp. The duty cycle D also remains substantially unchanged.

Another broken-line arrow points to the graph 58 of FIG. 1 which shows changes in the graph 56 due to an increase in the input voltage $V_{in}$ at the input port 30 of the voltage converter system 20. The input current 33 has increased so that the voltage ramp voltage ramp 54 rises more quickly to the point in which it matches the error voltage $V_{err}$. Accordingly, the duty cycle D decreases but the current ripple through the inductor 24 remains substantially unchanged.

The rising slope of the inductor current is (Vin−Vout)/L, so if $V_{in}$ and $V_{out}$ are unchanged but the load 28 has decreased, then the rising slope is unchanged but the error voltage $V_{err}$ rises and the level of the first current 33 rises. This is reflected in the voltage ramp 54 of graph 57 which has risen in amplitude but whose slope is substantially unchanged. The duty cycle also remains substantially unchanged. If, however, the input voltage $V_{in}$ increases, then, because the rising slope of the inductor current is given by $(V_{in}-V_{out})/L$, the slope of the voltage ramp 54 increases as shown in the graph 58. This causes the duty cycle D to also decrease to quickly compensate for the rise in the input voltage $V_{in}$. In summary, the duty cycle D changes in response to changes in the input voltage $V_{in}$ but does not substantially change in response to changes in the load 28 which causes changes in the output current $I_{out}$.

It has been found that the current feedback loop 50 of FIG. 1 may become unstable when the duty cycle D of the first transistor N1 is sufficiently increased, e.g., to values greater than 50%. This instability is essentially eliminated in the voltage converter system 60 of FIG. 2 which includes the elements of the system 20 of FIG. 1 with like elements indicated by like reference numbers. In contrast to the system 20, the controller 47 is now configured to also provide a compensation voltage ramp 62 to a summer 61 which also receives the voltage ramp 54 from the amplifier 52. In response to these inputs, the summer provides a summed voltage ramp 63 to the comparator 44. The comparator 44 now provides the PWM signal in response to the summed voltage ramp 63 and the error voltage $V_{err}$.

Figure 3A:
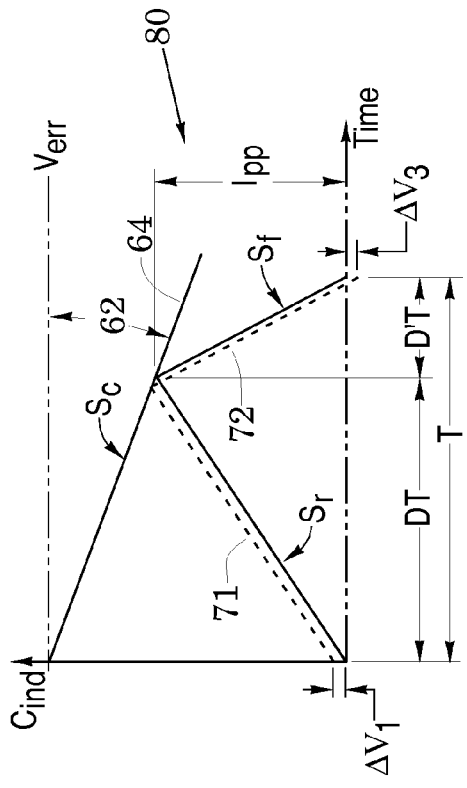
FIGS. 3A and 3B are diagrams of inductor currents in, respectively, the voltage converters of FIGS. 1 and 2.
Figure 3B:
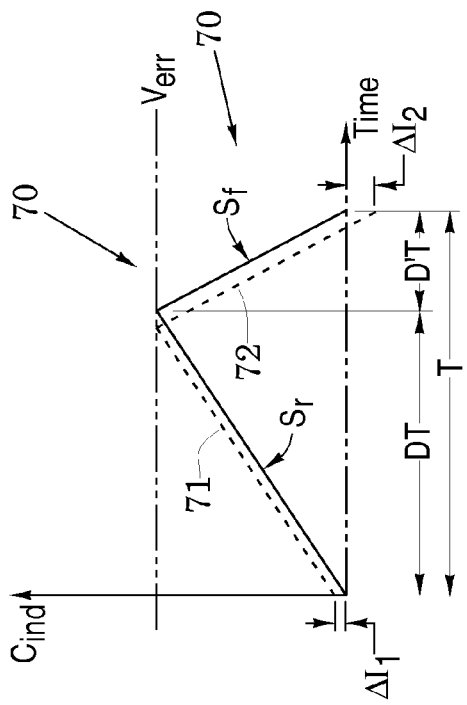
Figure 3C:
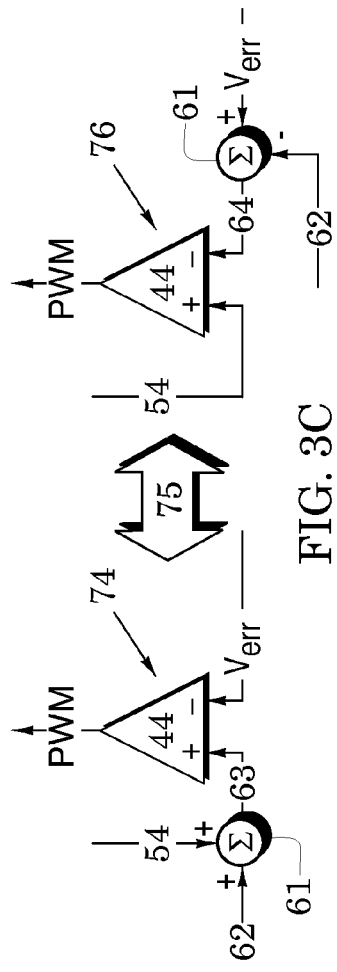
FIG. 3C is a diagram of portions of the voltage and current feedback loops of the voltage converter of FIG. 2 and of an equivalent circuit of these portions.

The stability of the voltage converter systems 20 and 60 can be compared with the aid the graphs 70 and 80 of FIGS. 3A and 3B and the equivalent loop structures shown in FIG. 3C. These current graphs plot inductor current $C_{ind}$ versus time for a case in which the duty cycle D of the first transistor N1 is substantially greater than 50%. The graphs are constructed to correspond to one period of the plot of inductor current in the graph 56 of FIG. 1, e.g., the period enclosed by an ellipse labeled 2. The current graph 70 is directed to the performance of the voltage converter systems 20 of FIG. 1 and the current graph 80 is directed to the performance of the voltage converter system 60 of FIG. 2.

To facilitate a performance analysis, it is assumed that the current graphs 70 and 80 may also be considered to indicate the voltage signals entering the comparator 44. This may be done by proper choices of the vertical coordinates of FIGS. 3A and 3B when they are indicating the voltage signals entering the comparator 44 or, alternatively, choosing the magnitude of the resistor 51 and/or the gain of the amplifier 52 of the voltage converter systems 20 and 60 to properly adjust the magnitude of the voltage signals. Although not shown, it should also be recalled that the voltage signal 54 drops to zero during the second portion D'T of the period T. With this understanding, the following analysis will sometimes be directed to the currents of the inductor 24 and sometimes be directed to the voltages entering the comparator 44.

In the graph 70, when the first transistor N1 is on during the first portion DT of the period T, the current through the inductor 24 ramps up with a rising slope $S_r$. This slope ends when the voltage ramp 54 of FIG. 1 matches the error voltage $V_{err}$ and the comparator 44 changes state to turn off the first transistor N1 and turn on the second transistor N2. During the second portion DT' of the period T, the inductor current now falls with a falling slope $S_f$.

In FIG. 3A, it is assumed that system noise introduces an initial current perturbation $\Delta I_1$ which causes the rising slope $S_r$ and falling slope $S_f$ to move to broken-line positions 71 and 72. Because the duty cycle D is greater than 50%, the rising slope $S_r$ is less than the falling slope $S_f$ and this relationship causes the initial current perturbation $\Delta I_1$ to grow into a greater current perturbation $\Delta I_2$ at the end of the period T. Over several clock periods, this increase of the current perturbation will lead to system instability.

To facilitate an analysis of the contrasting performance of the voltage converter system 60, FIG. 3C illustrates two equivalent circuits 74 and 76. The circuit 74 on the left is the arrangement in FIG. 2 in which the error voltage $V_{err}$ enters the negative input of the comparator 44 and summer 61 provides the summed voltage ramp 63 to the positive input in response to the voltage ramps 54 and 62. In the circuit 76 on the right, the summer 63 has been moved to provide a ramp 64 to the negative input of the comparator 44 wherein the ramp 64 is the difference between the error voltage $V_{err}$ and the compensation voltage ramp 62. The voltage ramp 54 is provided to the positive input of the comparator. The circuit 74 compares 54+62 to $V_{err}$. The equivalent circuit compares 54 to $V_{err}-62$ which is a mathematically-equivalent operation. The equivalency of the circuits 74 and 76 is indicated in FIG. 3C by a double-headed arrow 75.

The action of the equivalent circuit 76 is shown in the graph 80 of FIG. 3B. This graph indicates that when the first transistor N1 is on during the first portion DT of the period T, the current through the inductor 24 ramps up with a rising slope $S_r$. This slope ends when the voltage ramp 54 ramps up with a rising slope $S_r$ to where it matches the voltage ramp 64 which falls with a compensation slope $S_c$ that is determined by the difference between the error voltage $V_{err}$ and the compensation voltage ramp 62. The first transistor N1 of FIG. 2 is then turned off and the second transistor N2 turned on. In response, the current through the inductor 24 then ramps down with a falling slope $S_f$ to the end of the period T.

It is now apparent that the introduction of the compensation voltage ramp 62 shifts the falling slope $S_f$ sufficiently to reduce current perturbation $\Delta I_2$ at the end of the period T below the initial current perturbation $\Delta I_1$. This reduction will cause any noise perturbation to die out and insure the stability of the voltage converter system 60 of FIG. 2.

It has been found that a particularly effective voltage converter embodiment is formed when the compensation slope $S_c$ of FIG. 3B is set substantially equal to ½ of the falling slope $S_f$ as shown in the following equation:

$$S_c = \frac{1}{2} S_f. \quad (1)$$

If the current ripple of the graph 56 of FIG. 1 is represented as a peak-to-peak current $I_{pp}$, then the falling slope $S_f$ in FIG. 3B can be expressed as:

$$S_f = \frac{V_O}{L} = \frac{I_{pp}}{D'T} \quad (2)$$

wherein the peak-to-peak current $I_{pp}$ is shown in FIG. 3B. The compensation slope $S_c$ then becomes:

$$S_c = \frac{1}{2} \frac{I_{pp}}{D'T}. \quad (3)$$

In many voltage converter embodiments, it may be convenient to express the current ripple as a portion r of the maximum load current $I_{max}$ of the converter so that equation (3) becomes:

$$S_c = \frac{1}{2} \frac{r \, I_{max}}{D'T}. \quad (4)$$

To provide a feel for typical numbers for the compensation slope, the maximum load current may be 3 amperes and the portion r may be ⅓ in an exemplary voltage converter. The compensation voltage ramp 62 of FIG. 2 is preferably generated with the same resistance $R_{sns}$ that relates the inductor current 33 to the voltage ramp 54. In this embodiment, the controller 47 is configured so that the slope of the compensation voltage ramp 62 becomes:

$$\text{voltage ramp 62 slope} = \frac{1}{2} \frac{R_{sns} r \, I_{max}}{D'T}. \quad (5)$$

A controller embodiment 90 to provide the compensation voltage ramp 62 is shown in FIG. 4. It comprises a current generator 92 and a ramp generator 93. The ramp generator may essentially comprise a capacitor 94 that has a capacitance C and provides the voltage compensation ramp 62 in response to a compensation current $I_{dr}$ that drives the capacitor. In this case, the voltage ramp of equation (5) is given by the ratio of a drive current $I_{dr}$ to a capacitance C so that the compensation current $I_{dr}$ of the ramp generator 93 is given by:

$$I_{dr} = \frac{1}{2} \frac{C \, R_{sns} r \, I_{max}}{D'T}. \quad (6)$$

The factor ½ in equation (1) was chosen to illustrate a system embodiment. More generally, the factor ½ and the numerator of equation (5) form a constant k that varies with different embodiments of the voltage converter system 60 of FIG. 2. In one embodiment, therefore, the ramp generator 93 is a capacitor 94 (indicated by a curved arrow pointing to the ramp generator) and the required compensation current $I_{dr}$ from the current generator 92 can be simply expressed as:

$$I_{dr} = \frac{k}{D'T}. \quad (7)$$

The controller embodiment 90 is thus preferably configured so that the current generator 92 provides a compensation current whose amplitude is inversely proportional to the controlled time period D'T during which the second transistor is switched on in each switching period T of the voltage converter system. The shorter the controlled time period D'T, the greater the amplitude of the compensation current $I_{dr}$ and the greater the compensation slope $S_c$. Shorter controlled time periods D'T, are generally required to generate higher output voltages $V_{out}$. The driver 46 of FIG. 2 can be used to supply the controlled time periods D'T to the controller embodiment 90.

In a system embodiment, the compensation current $I_{dr}$ from the current generator 92 and the value of the capacitor 94 can be selected to cause the compensation ramp 62 of FIG. 4 to have a compensation rising slope $S_c$ less than the falling slope $S_f$ (shown in FIG. 3B). In another system embodiment, the compensation current $I_{dr}$ from the current generator 92 and the value of the capacitor 94 can be selected to cause the compensation ramp 62 of FIG. 4 to have a compensation rising slope $S_c$ between 30 and 70 percent of the falling slope $S_f$ (shown in FIG. 3B). In yet another system embodiment, the compensation current $I_{dr}$ from the current generator 92 and the value of the capacitor 94 can be selected to cause the compensation ramp 62 of FIG. 4 to have a compensation rising slope $S_c$ substantially one half of the falling slope $S_f$ (shown in FIG. 3B).

The voltage converter system 60 of FIG. 2 may operate in various operational modes. One of these is the PWM mode which has been described above in detail. When the current required by the load 28 drops very low, the switching losses in the first and second transistors N1 and N2 begins to dominate all other system losses. It may become advantageous, therefore, to leave the PWM mode and enter a pulse skip mode (also termed a pulse-frequency modulation (PFM) mode) in which the transistors are off most of the time and are only pulsed momentarily when the output voltage $V_{out}$ drops below some predetermined limit.

In the PFM mode, the first and second transistors N1 and N2 will be off for extended time periods so that the controlled time period signal D'T will not be available from the driver 46 in FIG. 2. However, FIG. 4 indicates the addition of a duty generator 96 which has the input and output voltages $V_{in}$ and $V_{out}$ and the clock signal CLK available. The ratio of the input and output voltages provides the duty cycle D from which D' is obtained since it is 1−D. The clock period T can be obtained from the clock signal. Therefore, the duty generator 96 can provide the controlled time period D'T to the current generator 92 in the PFM mode.

The switching voltage converter 21 in the system 60 of FIG. 2 has been shown in a buck configuration in which the first and second transistors N1 and N2 are coupled together to form a switching node 29, the capacitor 25 is coupled across the output port 27, and the inductor is coupled between the switching node 29 and the capacitor 25. However, the teachings described above may be applied to other switching voltage converter embodiments.

For example, the teachings can be used in a boost configuration 100 shown in FIG. 5A in which the first and second transistors are coupled together to form a switching node, the capacitor is coupled across the output port and is also coupled to the second transistor, and the inductor is coupled between the input port and the switching node.

For a second example, the teachings can be used in a buck-boost configuration shown in FIG. 5B in which the first and second transistors are respectively coupled to the input and output ports and further are coupled together to form a switching node, the capacitor is coupled across the output port, and the inductor is coupled to the switching node.

From the above disclosures, it is apparent the advantages of the disclosed voltage converter systems can be obtained with processes exemplified by the following steps:

switching through a first transistor a first current with a rising slope and subsequently switch through a second transistor a second current with a falling slope;

with a voltage feedback circuit, generating an error voltage in response to the difference between the output voltage and a reference voltage;

with a current feedback circuit, providing a feedback voltage ramp in proportional response to the rising slope; and summing a compensation voltage ramp having a compensation rising slope with the feedback voltage ramp to provide a summed voltage ramp to compare with the error voltage to thereby control duty cycles of the first and second transistors.

The converter embodiments described herein are exemplary and numerous modifications, variations and rearrangements can be readily envisioned to achieve substantially equivalent results, all of which are intended to be embraced within the spirit and scope of the appended claims.

I claim:

1. A voltage converter system to thereby generate an output voltage at an output port in response to an input voltage at an input port, comprising:

a switching voltage converter arranged to switch through a first transistor a first current with a rising slope and subsequently switch through a second transistor a second current with a falling slope;

a voltage feedback circuit arranged to generate an error voltage in response to the difference between said output voltage and a reference voltage;

a current feedback circuit arranged to provide a feedback voltage ramp in proportional response to said rising slope; and a controller configured to sum a compensation voltage ramp having a compensation rising slope with said feedback voltage ramp to provide a summed voltage ramp to compare with said error voltage to thereby control duty cycles of said first and second transistors;

wherein the compensation rising slope of said compensation voltage ramp is less than said falling slope.

2. The system of claim 1, wherein said compensation rising slope is between 30 and 70 percent of said falling slope.

3. The system of claim 1, wherein said compensation rising slope is one half of said falling slope.

4. The system of claim 1, wherein said first transistor is switched on for a controlled time period to obtain said output voltage and wherein said controller includes:

a current generator to provide a compensation current related to said controlled time period;

a capacitor to provide said compensation voltage ramp in response to said compensation current; and a summer to provide said summed voltage ramp in response to said feedback voltage ramp and said compensation voltage ramp.

5. The system of claim 4, wherein said current feedback circuit includes:

a resistor coupled to said input port to sense said first current; and a differential amplifier to provide said feedback voltage ramp in response to a voltage across said resistor.

6. The system of claim 1, wherein said first and second transistors are coupled together to form a switching node and said switching voltage converter further includes:

a capacitor coupled across said output port; and an inductor coupled between said switching node and said capacitor.

7. The system of claim 1, wherein said first and second transistors are coupled together to form a switching node and said switching voltage converter further includes:
a capacitor coupled across said output port and coupled to said second transistor; and
an inductor coupled between said input port and said switching node.

8. The system of claim 1, wherein said first and second transistors are coupled between said input and output ports and coupled together to form a switching node and said switching voltage converter further includes:
a capacitor coupled across said output port; and
an inductor coupled to said switching node.

9. A voltage converter system to thereby generate an output voltage at an output port in response to an input voltage at an input port, comprising:
a switching voltage converter arranged to switch through a first transistor a first current with a rising slope and subsequently switch through a second transistor a second current with a falling slope;
a voltage feedback circuit arranged to generate an error voltage in response to the difference between said output voltage and a reference voltage;
a current feedback circuit arranged to provide a feedback voltage ramp in proportional response to said rising slope; and
a controller configured to sum a compensation voltage ramp having a compensation rising slope with said feedback voltage ramp to provide a summed voltage ramp to compare with said error voltage to thereby control duty cycles of said first and second transistors;
wherein said first transistor is switched on for a controlled time period to obtain said output voltage and wherein said controller includes:
a current generator to provide a compensation current related to said controlled time period;
a capacitor to provide said compensation voltage ramp in response to said compensation current; and
a summer to provide said summed voltage ramp in response to said feedback voltage ramp and said compensation voltage ramp;
wherein said current feedback circuit includes:
a resistor coupled to said input port to sense said first current; and
a differential amplifier to provide said feedback voltage ramp in response to a voltage across said resistor; and
wherein said capacitor has a capacitance C, said resistor has a resistance R, said rising slope has an amplitude that is a portion r of a maximum current $I_{max}$ at said output port, k is a constant less than one, and said current generator is configured to provide said compensation current in accordance with the relationship:

$$\text{compensation current} = k \frac{C\,Rr\,I_{max}}{D'T}.$$

10. The system of claim 9, wherein said constant k is substantially one half.

11. A voltage converter system to thereby generate an output voltage at an output port in response to an input voltage at an input port, comprising:
a switching voltage converter arranged to switch, for a controlled time period, through a first transistor a first current with a rising slope and subsequently switch through a second transistor a second current with a falling slope;
a voltage feedback circuit arranged to generate an error voltage in response to the difference between said output voltage and a reference voltage;
a current feedback circuit arranged to provide a feedback voltage ramp in proportional response to said rising slope;
a duty generator configured to obtain a controlled time period during which said first transistor is switched on;
a current generator coupled to provide a compensation current related to said controlled time period;
a capacitor coupled to provide, in response to said compensation current, a compensation voltage ramp having a compensation rising slope; and
a summer to provide, in response to said feedback voltage ramp and said compensation voltage ramp, a summed voltage ramp to compare with said error voltage to thereby control duty cycles of said first and second transistors;
wherein the compensation rising slope of said compensation voltage ramp is less than said falling slope.

12. The system of claim 11, wherein said current feedback circuit includes:
a resistor coupled to said input port to sense said first current; and
a differential amplifier to provide said feedback voltage ramp in response to a voltage across said resistor.

13. The system of claim 11, wherein said compensation rising slope is between 30 and 70 percent of said falling slope.

14. The system of claim 11, wherein said compensation rising slope is one half of said falling slope.

15. A method to generate an output voltage at an output port in response to an input voltage at an input port, comprising the steps of:
switching through a first transistor a first current with a rising slope and subsequently switch through a second transistor a second current with a falling slope;
with a voltage feedback circuit, generating an error voltage in response to the difference between said output voltage and a reference voltage;
with a current feedback circuit, providing a feedback voltage ramp in proportional response to said rising slope; and
summing a compensation voltage ramp having a compensation rising slope with said feedback voltage ramp to provide a summed voltage ramp to compare with said error voltage to thereby control duty cycles of said first and second transistors;
wherein the compensation rising slope of said compensation voltage ramp is less than said falling slope.

16. The method of claim 15, wherein said compensation rising slope is one half of said falling slope.

17. The method of claim 15, further including the steps of:
switching said second transistor on for a controlled time period to obtain said output voltage;
a current generator to providing a compensation current that is inversely proportional to said controlled time period;
with a capacitor, providing said compensation voltage ramp in response to said compensation current; and
summing said feedback voltage ramp and said compensation voltage ramp to provide said summed voltage ramp.

* * * * *